(12) United States Patent
Firmin

(10) Patent No.: US 7,735,257 B1
(45) Date of Patent: Jun. 15, 2010

(54) FISHING RIGGING

(75) Inventor: Herman P. Firmin, Central, LA (US)

(73) Assignee: Knight Manufacturing Co., Inc., Tyler, TX (US)

( * ) Notice: Subject to any disclaimer, the term of this patent is extended or adjusted under 35 U.S.C. 154(b) by 34 days.

(21) Appl. No.: 12/154,133

(22) Filed: May 21, 2008

(51) Int. Cl.
*A01K 83/06* (2006.01)
(52) U.S. Cl. .................... 43/44.8; 43/44.2; 43/44.86
(58) Field of Classification Search ............ 43/44.8, 43/44.2, 42.29, 44.86
See application file for complete search history.

(56) References Cited

U.S. PATENT DOCUMENTS

| | | | | |
|---|---|---|---|---|
| 979,891 | A * | 12/1910 | Schield | 43/44.2 |
| 1,931,932 | A * | 10/1933 | Myers et al. | 43/42.16 |
| 2,476,126 | A * | 7/1949 | Weiss | 43/44.2 |
| 2,665,516 | A * | 1/1954 | Race | 43/42.51 |
| 2,755,593 | A * | 7/1956 | Thurman | 43/44.2 |
| 2,825,174 | A * | 3/1958 | Leinonen | 43/44.8 |
| 2,871,609 | A * | 2/1959 | Noches | 43/42.06 |
| 2,977,710 | A * | 4/1961 | Stambaugh | 43/44.2 |
| 3,105,319 | A * | 10/1963 | Whalen | 43/44.4 |
| 3,839,814 | A * | 10/1974 | Sykora | 43/44.2 |
| 3,848,354 | A * | 11/1974 | Austad et al. | 43/42.49 |
| 3,914,896 | A * | 10/1975 | Sahagian | 43/44.6 |
| 3,942,282 | A * | 3/1976 | Flagel | 43/44.2 |
| 4,129,957 | A * | 12/1978 | Thirlby | 43/42.49 |
| 4,244,133 | A | 1/1981 | Martinek | 43/42.25 |
| 5,113,614 | A | 5/1992 | Morita | 43/42.74 |
| 5,220,743 | A | 6/1993 | McClellan | 43/44.81 |
| 5,666,760 | A * | 9/1997 | Bramblett et al. | 43/44.83 |
| 5,784,827 | A | 7/1998 | Jimenez et al. | 43/44.2 |
| 5,855,089 | A | 1/1999 | Hockmeyer et al. | 43/42.37 |
| 5,890,317 | A | 4/1999 | Hollomon | 43/44.8 |
| 6,219,956 | B1 * | 4/2001 | Hurt | 43/44.4 |
| 6,516,552 | B2 * | 2/2003 | Hawkins | 43/42.09 |
| 7,240,453 | B1 | 7/2007 | Safwat | 43/17.1 |
| 2003/0182843 | A1 * | 10/2003 | Smart et al. | 43/44.2 |

* cited by examiner

*Primary Examiner*—Christopher P Ellis
(74) *Attorney, Agent, or Firm*—Charles M. Kaplan

(57) ABSTRACT

One aspect of the invention involves a single, continuous, unbroken, one-piece strand of wire that may be bent, twisted and distorted into a hook-hanging implement for rigging a hook or hooks on fishing lure bodies. Another aspect of the invention involves a plurality of wire strands or segments that may be bent, twisted, distorted and conjoined into a hook hanging implement for rigging a hook or hooks on fishing lure bodies. The orientation, size, shape, weight and number of twists, bends and distortions of these hook-hanging implements may be changed to alter or adjust the action of a fishing lure, or to repair or replace damaged parts of a fishing lure.

19 Claims, 3 Drawing Sheets

US 7,735,257 B1

FISHING RIGGING

BACKGROUND OF THE INVENTION

This invention relates to soft bodied fishing lures, such as plastic worms, minnows and the like, and more particularly to improved ways of rigging fish hooks on such lures. Prior riggings for soft bodied fishing lures often employed several disconnected components, and all components often were not at hand when they were needed on a lake or stream when a fisherman had to repair, modify or change a lure body or the hook being used. Also, prior riggings did not always permit tuning or changing the action or motions of the lure as it was drawn through water.

OBJECTIVES OF THE INVENTION

Accordingly, it is an object of this invention to provide improved rigging for fishing lures.

Another object is to provide a rig for hanging a freely swinging fish hook below a fishing lure.

An additional object is to provide a rig for securing a line-attachment eye to a soft bodied fishing lure.

Another object is to provide a single one-piece rig that securely attaches a free-swinging hook and a line-connecting eye to a fishing lure body.

Another object is to provide a hook-hanging rig that a lure body can be molded upon when the lure body is cast, or the hook-hanging rig can be attached to a lure body after the lure body has been manufactured.

A further object is to provide a fishing lure that can be readily replaced, repaired or modified.

An additional object is to provide ways to change and adjust or tune the action of fishing lures.

A further object is to provide versatile rigging for fishing lures that enables fishermen of relatively low skill to effectively fish a variety of soft bodied lures in a wide range of environments and conditions.

A further object is to provide fishing rigs and lures that are durable, economical, attractive to fish, easy to use, change, repair and adjust, and which do not possess defects found in similar prior art fishing tackle.

Other objects and advantages of fishing rigging and tackle incorporating this invention will be found in the specification and claims and the scope of the invention will be set forth in the claims.

DESCRIPTION OF THE INVENTION

Figure 1:
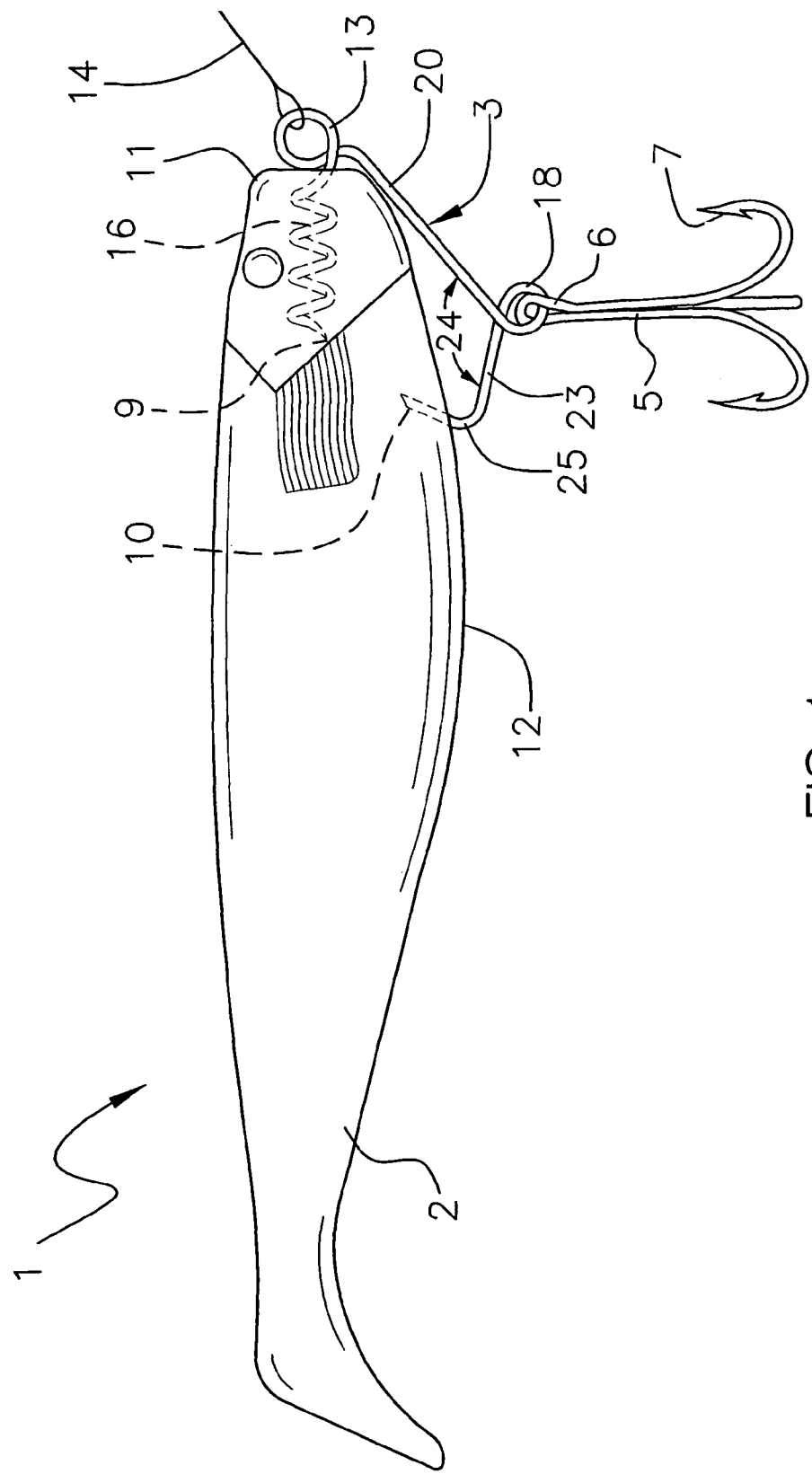
FIG. 1 is an enlarged side view of a fishing lure with rigging in accord with this invention.

The drawing shows a fishing lure 1 having a soft, flexible resilient body 2 rigged in accord with this invention. According to one aspect of this invention, rigging used to hang a hook 5 in a freely swinging manner below the lure body 2 may be a unitary one-piece implement 3. The hook 5 has an eye 6, and may have from one to three prongs, each ending in a barb 7.

The one-piece hook hanging implement 3 is made from a single, continuous, unbroken strand 8 of wire, all parts of which merge seamlessly with and into each other. The strand 8 should be relatively stiff but bendable, and may be spring or stainless steel wire, titanium wire, or the like, having an essentially circular cross-section, with a diameter in the range of from about 0.025 to about 0.050 inches. A first terminal end 9 and a second terminal end 10 of the strand 8 may be embedded in the lure body 2 when the body is cast in a mold or the ends 9 and 10 may be pushed, inserted or otherwise embedded into the soft body 2 at any time after the body 2 has been manufactured.

As shown in FIG. 1, end 9 has penetrated and is imbedded in lure body 2 at a first location adjacent the front end 11 of the lure. Second terminal end 10 of wire strand 8 has penetrated and is embedded in lure body 2 at a second location adjacent the lure bottom 12 that is spaced from the first location where end 9 has been embedded.

Strand 8 has been wound or bent back to overlap itself so as to create an essentially circular first loop 13 at the end 11 of the lure. A fishing line 14 may be connected or tied in conventional manner to the loop 13. A first portion 15 of the strand 8 located between first terminal end 9 and first loop 13 may be distorted, or bent, into a helical spiral, or corkscrew shape 16, so as to resist the pulling of implement 3 from the lure body at its front end. First portion 15 merges continuously and seamlessly into a first end 17 of first loop 13.

Strand 8 has been bent back to overlap itself so as to create an essentially circular second loop 18 for connecting hook 5 to lure body 2. Loop 18 is dimensioned to pass through the eye 6 in a manner that permits hook 5 to swing freely below the lure. One end of implement 3 may be inserted through eye 6, and then hook 5 may be moved along implement 3 until eye 6 reaches second loop 18. Pushing eye 6 against the overlapping parts of strand 8 that form loop 18 temporarily separates those parts and allows eye 6 to be snapped into loop 18. Hook 5 may be removed from implement 3 by reversing the order of these steps.

A second end 19 of first loop 13 merges continuously and seamlessly into a second portion 20 of strand 8, and second portion 20 merges continuously and seamlessly into a first end 21 of second loop 18. Second portion 20 is bent to extend at an angle away from first loop 13. A second end 22 of second loop 18 merges continuously and seamlessly into a third portion 23 of wire strand 8. Third portion 23 may extend at an obtuse angle 24 away from second portion 18, and portion 23 merges continuously and seamlessly into a fourth portion 25 of strand 8. Fourth portion 25 may be bent at an acute angle 26 away from third portion 23 and portion 25 ends in second terminal end 10. The second, third and fourth portions each may have a different length. The third and fourth portions may be in the same plane, the third portion may be longer than the fourth portion. Fourth portion extends in a direction that causes forces on first loop 13 acting to pull first end 9 out of lure body 2 at that location act, at the same time, to imbed second end 10 further into the lure body at a different location, and thus maintain the connection between the lure body 2 and he hook-hanging implement 3.

Figure 2:
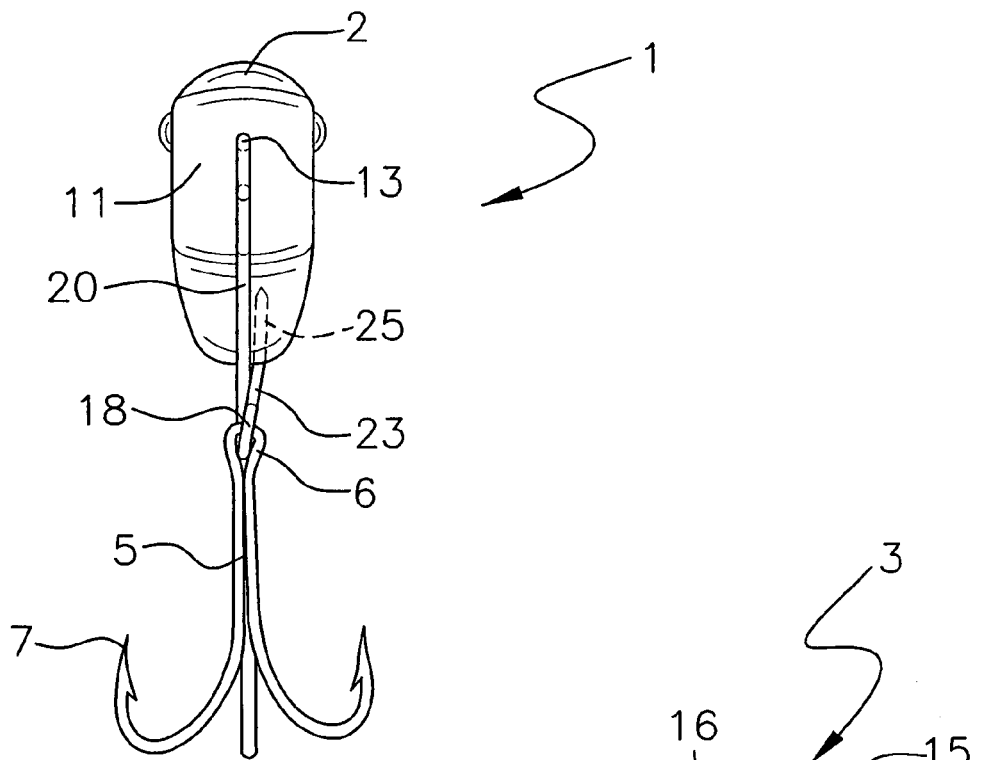
FIG. 2 is a front end view of the lure shown in FIG. 1.
Figure 3:
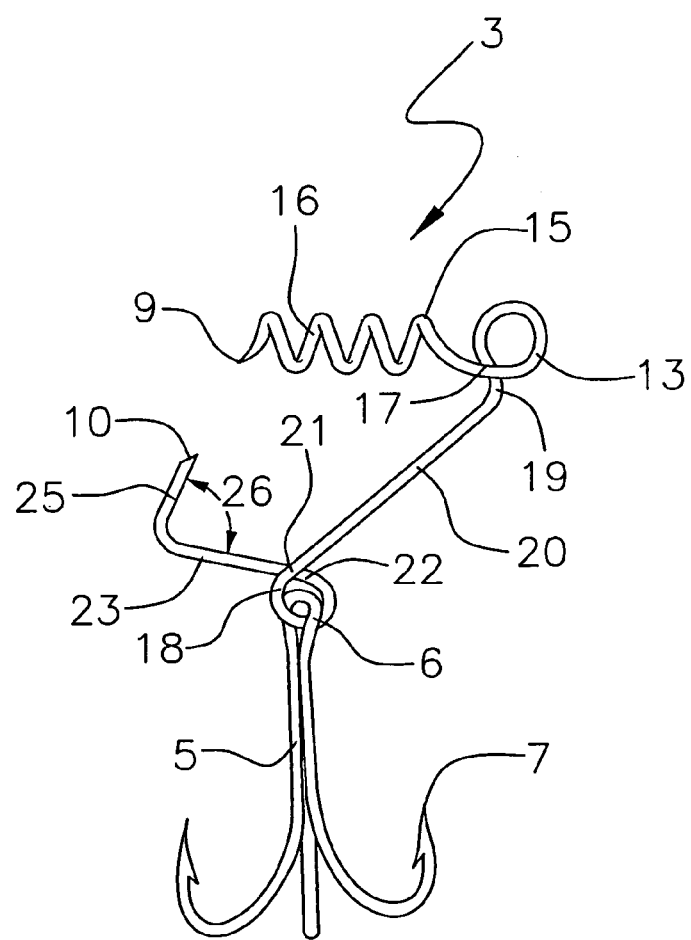
FIG. 3 is an enlarged side view of the embodiment of an implement for hanging hooks as used in FIG. 1.

FIGS. 4-9 show additional embodiments of the invention that are identical to the embodiment of FIGS. 1-3, except for the structural features specifically shown and described. The same reference numerals that have been used in FIGS. 1-3 are used in FIGS. 4-9 to identify the same parts of the hook-hanging implement 3.

Figure 4:
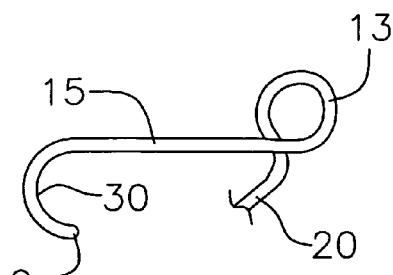
FIG. 4 is an enlarged, partial side view of the another embodiment of an implement for hanging hooks in accord with this invention.

In FIG. 4 the first portion 15 has been distorted or bent into a reverse bend or hook 30 oriented in a direction generally toward the first loop 13.

Figure 5:
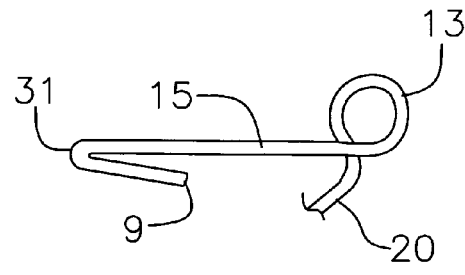
FIG. 5 is an enlarged, partial side view of the another embodiment of an implement for hanging hooks in accord with this invention.

In FIG. 5 the first portion 15 has been distorted or bent into a pinched reverse bend 31 oriented in a direction generally toward first loop 13.

Figure 6:
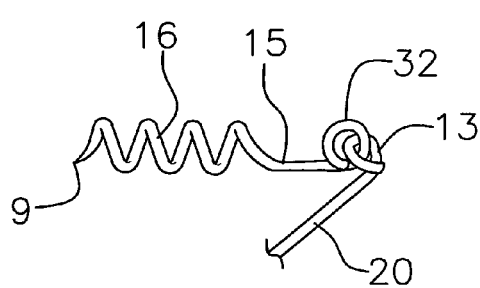
FIG. 6 is an enlarged, partial side view of the another embodiment of an implement for hanging hooks in accord with this invention.
Figure 7:
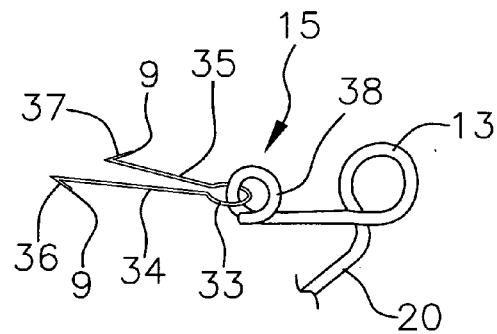
FIG. 7 is an enlarged, partial side view of the another embodiment of an implement for hanging hooks in accord with this invention.
Figure 8:
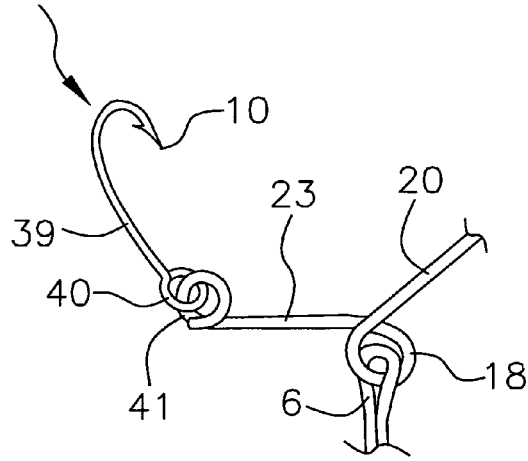
FIG. 8 is an enlarged, partial side view of the another embodiment of an implement for hanging hooks in accord with this invention.

FIGS. 6-8 illustrate another aspect of the invention in which the hook-hanging implement 3 may comprise two or more interconnected components or portions, and the eye 6 of hook 5 may be worked into the second loop 18 in the manner described above.

In FIG. 6 the first portion 15 has been distorted or bent into a helix 16 and bent into an end loop 32 that passes through first loop 13 so as to attach and connect the helix 16 to hook-hanger implement 3.

In FIG. 7 the first portion 15 may included a wire that has been bent double at 33 into two arms 34 and 35, each of which has been distorted or bent into a reverse bend or hook 36 or 37, with the hooks 36 and 37 being oriented in a direction generally toward first loop 13 and defining the first end 9 of the implement 3. The bend at 33 passes through an intermediate loop 38 bent in portion 15 so as to attach and connect the arms 34 and 35 to hook-hanger implement 3.

In FIG. 8 the fourth portion of the hook-hanger implement 3 may include a fish hook 39 having its eye 40 engaged in a loop 41 bent at the end of third portion 23 so as to attach the hook 39 to the implement 3 and define the second end 10 of the implement 3 by the point of the hook 39.

Figure 9:
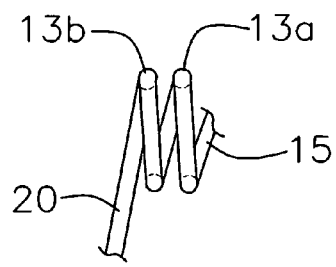
FIG. 9 is an enlarged, partial end view of the another embodiment of an implement for hanging hooks in accord with this invention.

FIG. 9 shows another embodiment in which the wire strand 8 may be bent continuously and seamlessly into two or more side-by-side essentially identical first loops 13a and 13b.

This invention provides fishermen with numerous riggings for hanging a free-swinging hook below a fish lure body 2. Hooks 5 may be changed by easing fourth portion 25 out of the bottom 12 of lure body 2, and working the eye 6 out of second loop 18 and then along portions 23 and 25 until eye 6 has been moved past second end 10, and then reversing these steps with a different hook. Thus, the size, and weight of the hook as well as its number of barbs on the lure can be changed at different locations or when fishing conditions change. The orientation, size, shape, angle and number of twists, bends and distortions of the hook-hanging implement 3 may be changed during a fishing session to alter or adjust the action of a fishing lure to different or changing conditions that occur during the fishing trip, or to correct he action of a lure that has been damaged by a snag or by a striking or hooked fish. Also, the hook hanging implement 3 may be removed from damaged lure bodies and reused on other lure bodies.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. An implement having first and second ends for hanging a fish hook on an artificial fishing lure, comprising:

said first end of said implement being capable of penetrating and being imbedded inside of said fishing lure at a first location;

said implement being bent back on itself so as to form a first closed loop for connecting said implement, said fishing lure and said fish hook to a fishing line;

a first portion of said implement between said first end and said first loop being distorted said so as to resist pulling of said implement from said fishing lure at said first location;

said implement being bent back on itself so as to form a second closed loop for connecting said fish hook to said fishing lure, said second loop being dimensioned to pass through an eye of said fish hook;

an end of said first loop merging into a second portion of said implement, said second portion merging into a first end of said second loop, said second portion extending away from said first loop;

a second end of said second loop merging into a third portion of said implement, said third portion extending at an angle away from said second portion;

said second end of said implement being capable of penetrating and being imbedded inside of said fishing lure at a second location that is spaced from said first location;

said third portion connecting a fourth portion of said implement that terminates in said second end of said implement, said fourth portion extending away from said third portion; and said first portion being bent back on itself into a closed end loop that passes through said first closed loop so as to connect said first portion to said implement.

2. An implement for hanging a fish hook on a fishing lure as defined in claim 1, further comprising: said fourth portion extending in a direction that causes forces on said first loop acting to pull said first portion out of said fishing lure to act at the same time to imbed said second end into said fishing lure.

3. An implement for hanging a fish hook on a fishing lure as defined in claim 1, further comprising: said second, third and fourth portions being of different lengths, and said fourth portion extending in a direction generally toward another portion of said implement so as to cause forces on said first loop that act to pull said first portion out of said fishing lure to act at the same time to imbed said second end of said implement into said fishing lure.

4. An implement for hanging a fish hook on a fishing lure as defined in claim 1, further comprising: said first portion of said implement being distorted into a helical coil that resists pulling of said implement out of said fishing lure.

5. An implement for hanging a fish hook below an artificial fishing lure, said hook having an eye adjacent one of its ends, said implement comprising:

a first terminal end and a second terminal end;

said first terminal end of said implement being capable of penetrating and being imbedded in said fishing lure at a first location;

said implement being wound back to overlap itself so as to form a generally circular closed first loop for connecting said implement, said fishing lure and said hook to a fishing line;

a first portion of said implement between said first point and said first loop being distorted said so as to resist pulling of said implement from said fishing lure at said first location, said first portion being connected to said first loop;

said implement being wound back to overlap itself so as to form a generally circular closed second loop for connecting said hook to said fishing lure, said second loop being dimensioned to pass through said eye of said hook and permit said hook to swing freely below said fishing lure;

said first loop merging continuously into a second portion of said implement, said second portion merging continuously into a first end of said second loop, said second portion being bent to extend at an angle in a direction away from said first loop;

a second end of said second loop merging continuously into a third portion of said implement, said third portion being bent to extend at an obtuse angle in a direction away from said second portion;

said second terminal end of said implement being capable of penetrating and being imbedded in said fishing lure at a second location that is spaced from said first location; and said third portion merging continuously into a fourth portion of said implement that ends in said second terminal end, said fourth portion being bent so as to extend at an angle to said third portion in a direction that causes forces on said first loop acting to pull said first terminal end from said fishing lure at the same time act to imbed said second terminal end into said fishing lure.

6. A implement for hanging a fish hook on a fishing lure as defined in claim 5, further comprising: said implement consisting of a single, continuous, unbroken strand of wire, said first portion merging into one end of said first loop, said third portion merging into said fourth portion, and said fourth portion being bent so as to extend at an angle from said third portion.

7. An implement for hanging a fish hook on a fishing lure as defined in claim 5, further comprising: said first portion of said implement being distorted into a hook that resists pulling of said implement out of said fishing lure.

8. A implement for hanging a fish hook on a fishing lure as defined in claim 5, further comprising: said first portion of said implement being distorted into a hook in which said first end is reverse bent so as to extend in a direction generally toward said first loop to resist pulling of said implement out of said fishing lure.

9. A implement for hanging a fish hook on a fishing lure as defined in claim 8, further comprising: said hook comprising a pair of reverse bends.

10. A implement for hanging a fish hook on a fishing lure as defined in claim 1, further comprising: said third portion having an end loop and said fourth portion comprising a fish hook having its eye connected to said end loop so as to attach said fish hook to said implement.

11. An implement for hanging a fish hook on an artificial fishing lure as defined in claim 5, further comprising: said second, third and fourth portions having different lengths.

12. An implement for hanging a fish hook on an artificial fishing lure as defined in claim 5, further comprising: said second, third and fourth portions being of different lengths, said third portion being longer than said fourth portion, said fourth portion extending at an acute angle to said third portion, and said third and fourth portions being in essentially the same plane.

13. An implement for hanging a fish hook on an artificial fishing lure as defined in claim 5, further comprising: said first portion of said implement being distorted into a helical coil that resists pulling of said implement from said fishing lure.

14. An artificial fishing lure comprising:
a fishing lure body;
a fish hook having an eye adjacent one of its ends; and
an implement for hanging said fish hook on and below said fishing lure body, said implement comprising:
a first terminal end and a second terminal end spaced from each other, said first terminal end penetrating and being imbedded in said fishing lure at a first predetermined location and a second terminal end penetrating and being imbedded in said fishing lure body at a second predetermined location that is spaced from said first predetermined location;
said implement being wound back so as to overlap itself and form a first closed loop for connecting said implement, said fishing lure and said hook to a fishing line;
a first portion of said implement between said first point and said first loop being distorted said so as to resist pulling of said implement from said fishing lure at said first predetermined location;
said implement being wound back so as to overlap itself and form a second closed loop connecting said fish hook to said fishing lure, said second loop passing through said eye of said fish hook and enabling a barb of said fish hook to swing freely below said fishing lure body;
said first loop merging continuously into a second portion of said implement, said second portion merging continuously into a first end of said second loop, said second portion being bent to extend at an angle in a direction away from said first loop;
a second end of said second loop merging continuously into a third portion of said implement, said third portion being bent to extend at an obtuse angle away from said second portion; and
said third portion merging continuously into a fourth portion of said implement that ends in said second terminal end, said fourth portion to extending at an angle away from said third portion.

15. An artificial fishing lure as defined in claim 14, further comprising: said fourth portion extending in a direction generally toward another portion of said implement so as to cause forces on said first loop acting to pull said first portion out of said fishing lure to act at the same time to imbed said second point into said fishing lure.

16. An artificial fishing lure as defined in claim 14, further comprising: said second, third and fourth portions being of different lengths, and said fourth portion extending in a direction that causes forces on said first loop acting to pull said first portion out of said fishing lure act at the same time to imbed said second point into said fishing lure.

17. An artificial fishing as lure defined in claim 14, further comprising: said first portion of said implement being distorted into a helical coil that resists pulling of said implement from said fishing lure.

18. An implement for hanging a fish hook on an artificial fishing lure as defined in claim 5, further comprising: said first portion being bent back on itself into a closed end loop that passes through said closed first loop so as to connect said first portion to said implement.

19. An artificial fishing lure as defined in claim 14, further comprising: said first portion being bent back on itself into a closed end loop that passes through said first closed loop so as to connect said first portion to said implement.

* * * * *